United States Patent
Kodaira et al.

(10) Patent No.: US 8,971,635 B2
(45) Date of Patent: Mar. 3, 2015

(54) IMAGE PROCESSING APPARATUS, CONTENT DELIVERY SYSTEM, IMAGE PROCESSING METHOD, AND PROGRAM

(75) Inventors: Takayuki Kodaira, Tokyo (JP); Satoshi Imaizumi, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 131 days.

(21) Appl. No.: 13/582,198

(22) PCT Filed: Jan. 20, 2011

(86) PCT No.: PCT/JP2011/000296
§ 371 (c)(1),
(2), (4) Date: Aug. 31, 2012

(87) PCT Pub. No.: WO2011/108183
PCT Pub. Date: Sep. 9, 2011

(65) Prior Publication Data
US 2012/0321197 A1    Dec. 20, 2012

(30) Foreign Application Priority Data

Mar. 2, 2010  (JP) .................................. 2010-045744

(51) Int. Cl.
*G06K 9/00*  (2006.01)
*H04N 21/414*  (2011.01)
(Continued)

(52) U.S. Cl.
CPC ..... *H04N 21/41415* (2013.01); *H04N 21/4223* (2013.01); *H04N 21/44008* (2013.01);
(Continued)

(58) Field of Classification Search
CPC ....... G06K 9/36; G06K 9/46; G06K 9/00228; G06K 9/6255; G06K 9/3208; G06K 9/00268; G06T 1/00; G06T 7/00; G06T 7/0042; G06T 2207/10016; G06T 2207/30201; G09F 19/00

USPC ......... 382/118, 116, 165, 195, 190, 103, 203, 382/117, 159, 289, 284; 348/348; 340/345
See application file for complete search history.

(56) References Cited

U.S. PATENT DOCUMENTS 7,284,201 B2 * 10/2007 Cohen-Solal .................. 715/738
7,502,496 B2 *  3/2009 Kozakaya et al. ............. 382/118
7,873,186 B2 *  1/2011 Kawada ......................... 382/103
8,320,643 B2 * 11/2012 Nakanowatari et al. ...... 382/118

(Continued)

FOREIGN PATENT DOCUMENTS

CN    1557083 A    12/2004
JP    2003-271084 A    9/2003
(Continued)

OTHER PUBLICATIONS

Communication dated Jul. 31, 2014, from the State Intellectual Property Office of The People's Republic of China in counterpart Chinese Application No. 201180011876.0.

*Primary Examiner* — Sheela Chawan
(74) *Attorney, Agent, or Firm* — Sughrue Mion, PLLC

(57) ABSTRACT

Disclosed herein is an image processing apparatus including an upper body feature data storage unit (110) which stores upper body directional feature data, which indicates the upper body of a person and indicates that the upper body is facing a specific direction, for each of a plurality of directions in conjunction with directional data indicative of the direction of the upper body directional feature data; and an upper body detection unit (140) which extracts upper body image data indicative of the upper body of the person from image data by reading the plurality of upper body directional feature data stored in the upper body feature data storage unit (110) in conjunction with the directional data and using each of the plurality of upper body directional feature data.

14 Claims, 18 Drawing Sheets

(51) Int. Cl.
*H04N 21/4223* (2011.01)
*H04N 21/44* (2011.01)
*H04N 21/442* (2011.01)
*G06T 7/00* (2006.01)

(52) U.S. Cl.
CPC ........ *H04N21/44218* (2013.01); *G06T 7/0042* (2013.01); *G06T 2207/10016* (2013.01); *G06T 2207/30196* (2013.01); *G06T 2207/30201* (2013.01)
USPC .......................................... 382/195; 382/118

(56) References Cited

U.S. PATENT DOCUMENTS 8,411,997 B2 * 4/2013 Iwamoto ...................... 382/289
2003/0052911 A1 3/2003 Cohen-solal

FOREIGN PATENT DOCUMENTS

| | | |
|---|---|---|
| JP | 2005-503726 A | 2/2005 |
| JP | 2006-65447 A | 3/2006 |
| JP | 2006-254274 A | 9/2006 |
| JP | 2008-85685 A | 4/2008 |

* cited by examiner

| DIRECTION | UPPER BODY DIRECTIONAL FEATURE DATA |
|---|---|
| 0° | x x . x x |
| 90° | x x x . x x |
| 180° | x . x x |
| 270° | x x x x . x x |

| DIRECTION | FACIAL FEATURE DATA |
|---|---|
| 0° | △.× × |
| 90° | △△△.× × |
| 180° | △△.× × |
| 270° | △△△△.× × |

| VIDEO IDENTIFICATION INFORMATION | 001 |
|---|---|
| FRAME | MM/DD hh:mm:ss |
| FACIAL DIRECTION | 0° |
| 0-001.jpg ||
| 0-002.jpg ||
| 0-003.jpg ||
| ⋮ ||

| VIDEO IDENTIFICATION INFORMATION | 001 |
|---|---|
| FRAME | MM/DD hh:mm:ss |
| UPPER BODY DIRECTION | 0° |
| FACIAL DIRECTION | 0° |
| 0-001.jpg ||
| 0-002.jpg ||
| 0-003.jpg ||
| ⋮ ||

| VIDEO IDENTIFICATION INFORMATION | 001 |
| --- | --- |
| FRAME | MM/DD hh:mm:ss |
| UPPER BODY DIRECTION | 0° |
| 0-001.jpg ||
| 0-002.jpg ||
| 0-003.jpg ||
| ⋮ ||

| DIRECTIONAL DATA | 0° |
|---|---|
| MALE:AGE | FEATURE DATA |
| TEENS | × ×.× × |
| TWENTIES | × × ×.× × |
| THIRTIES | ×.× × |
| ⋮ | ⋮ |

| VIDEO IDENTIFICATION INFORMATION | 001 | |
|---|---|---|
| FRAME | MM/DD hh:mm:ss | |
| FACIAL DIRECTION | 0° | |
| FACIAL IMAGE DATA | ATTRIBUTE | |
| 0-001.jpg | TEENS: MALE | |
| 0-002.jpg | TEENS: FEMALE | |
| 0-003.jpg | TWENTIES: FEMALE | |
| ⋮ | ⋮ | |

| DATE | AUDIENCE RATING |
|---|---|
| APRIL, 1 | × × |
| APRIL, 2 | × × |
| APRIL, 3 | × × |
| ⋮ | ⋮ |

IMAGE PROCESSING APPARATUS, CONTENT DELIVERY SYSTEM, IMAGE PROCESSING METHOD, AND PROGRAM

CROSS REFERENCE TO RELATED APPLICATIONS

This application is a National Stage of International Application No. PCT/JP2011/000296, filed on Jan. 20, 2011, which claims priority from Japanese Patent Application No. 2010-045744, filed on Mar. 2, 2010, the contents of all of which are incorporated herein by reference in their entirety.

TECHNICAL FIELD

The present invention relates to an image processing apparatus, a content delivery system, an image processing method, and a program which are used to extract a figure from an image.

BACKGROUND ART

A service (hereinafter referred to as "digital signage") in which an image display apparatus is installed at a location through which arbitrary passers-by pass and in which information is provided to passers-by using the image display apparatus has been spread out. As one of the technologies related to such service, there is a technology disclosed in Patent Document 1. The technology enables image information about the face, the upper half of the body, or the whole body of a passer-by to be obtained, and the configuration of the face to be extracted as a feature value by parameterizing the configuration of the face based on the pieces of image information, thereby determining information to be provided to the passer-by based on the extracted feature value.

RELATED DOCUMENT

Patent Document

[Patent Document 1] Japanese Unexamined Patent Application Publication No. 2003-271084

DISCLOSURE OF THE INVENTION

In digital signage, it is important to detect the number of people who pass by in front of an image display apparatus and the directions of the bodies of passers-by in order to measure the effect of information provision. In the related art, since a facial image is directly extracted from image data, it is difficult to detect a person whose face is not sufficiently taken in image data, for example, a person who is facing backward. Therefore, it is desirable to develop a technology which enables a figure to be accurately detected regardless of the direction of a person and which enables the direction of the body of the person to be detected.

An object of the present invention is to provide an image processing apparatus, a content delivery system, an image processing method, and a program which enable a figure to be accurately detected regardless of the direction of a person and which enable the direction of the body of the person to be detected.

According to the present invention, there is provided an image processing apparatus including: an upper body feature data storage unit which stores upper body directional feature data, which indicates the upper body of a person and indicates that the upper body is facing a specific direction, for each of a plurality of directions in conjunction with directional data indicative of the direction of the upper body directional feature data; and an upper body detection unit which extracts upper body image data indicative of the upper body of the person from image data by reading the plurality of upper body directional feature data stored in the upper body feature data storage unit in conjunction with the directional data and using each of the plurality of upper body directional feature data.

According to the present invention, there is provided a content delivery system including: a content storage unit which stores image content; an image display apparatus which receives the image content stored in the content storage unit over a communication network, and displays the received image content; an imaging apparatus which images the area in front of the image display apparatus and generates image data; and an image processing apparatus which receives the image data over the communication network and processes the received image data. The image processing apparatus includes an upper body feature data storage unit which stores upper body directional feature data, which indicates the upper body of a person and indicates that the upper body is facing a specific direction, for each of a plurality of directions in conjunction with directional data indicative of the direction of the upper body directional feature data, and an upper body detection unit which extracts upper body image data indicative of the upper body of the person from the image data by reading the plurality of upper body directional feature data stored in the upper body feature data storage unit in conjunction with the directional data and using each of the plurality of upper body directional feature data.

According to the present invention, there is provided an image processing apparatus including: an image acquisition unit which obtains image data; and an image processing unit which extracts upper body image data indicative of the upper body of a person from the image data obtained from the image acquisition unit, and specifies the direction of a body indicated by the upper body image data.

According to the present invention, there is provided an image processing method including: allowing a computer to store upper body directional feature data, which indicates the upper body of a person and indicates that the upper body is facing a specific direction, for each of a plurality of directions in conjunction with directional data indicative of the direction of the upper body directional feature data; and allowing the computer to extract upper body image data indicative of the upper body of the person from image data by using each of the plurality of the upper body directional feature data.

According to the present invention, there is provided a program which causes a computer to function as an image processing apparatus, the program causing the computer to implement functions of: storing upper body directional feature data, which indicates the upper body of a person and indicates that the upper body is facing a specific direction, for each of a plurality of directions in conjunction with directional data indicative of the direction of the upper body directional feature data; and extracting upper body image data indicative of the upper body of the person from an image data by using each of the plurality of the upper body directional feature data.

According to the present invention, it is possible to accurately detect a figure regardless of the direction of a person, and to detect the direction of the body of the person.

BRIEF DESCRIPTION OF THE DRAWINGS

The above described object and other objects, features, and advantages will be further apparent in the preferred embodiments which will be described below and the accompanying drawings.

FIG. 2 is a view illustrating the configuration of data stored in an upper body feature data storage unit in table form.

FIG. 3 is a view illustrating the configuration of data stored in a facial feature data storage unit in table form.

FIG. 4 is a view illustrating the configuration of data stored in a facial image storage unit in table form.

FIG. 6 is a view illustrating a modification of the configuration of the data stored in the facial image storage unit.

FIG. 8 is a view illustrating the configuration of data stored in an upper body image storage unit in table form.

FIG. 11 is a view illustrating data stored in an attribute data storage unit in table form.

FIG. 12 is a view illustrating data stored in a facial image storage unit in table form.

FIG. 14 is a view illustrating data stored in an audience rating storage unit in table form.

DESCRIPTION OF EMBODIMENTS

Figure 1:
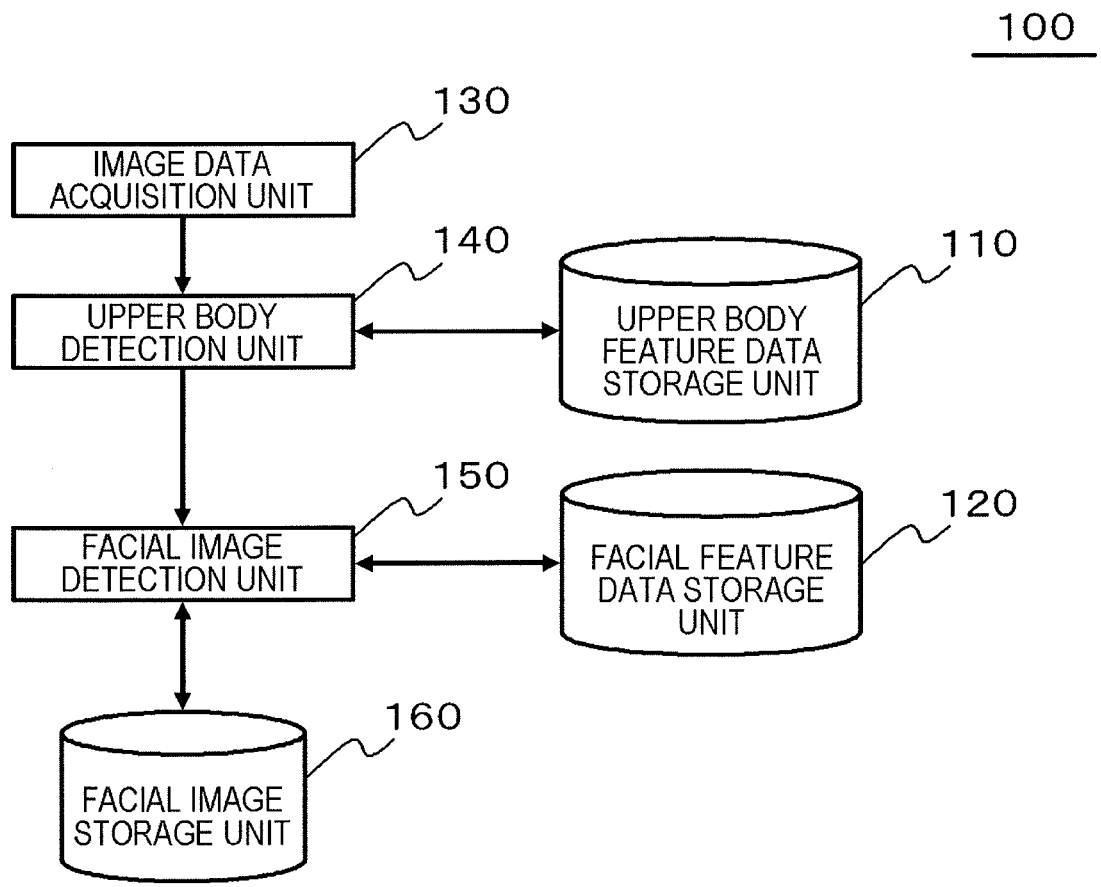
FIG. 1 is a block diagram illustrating the configuration of an image processing apparatus according to a first embodiment.

Hereinafter, embodiments of the present invention will be described with reference to the accompanying drawings. Further, reference now should be made to the drawings, throughout which the same reference numerals are used to designate the same components, and description thereof will not be repeated. In addition, in each embodiment below, "store" includes both a case where data is temporarily stored in a memory and a case where data is stored and maintained on a hard disk or the like. Therefore, in the hardware configuration, a storage unit may be a memory, a hard disk, storage, or the like.

In addition, in each embodiment below, upper body directional feature data indicates data used when the upper body of a person is extracted from image data. In detail, the upper body directional feature data is data which indicates the upper body of a person and indicates that the upper body is facing a specific direction. In addition, directional data is data which indicates a direction which the upper body or the face of a person is facing. Face feature data indicates data used when the face of a person is extracted from the image data. Video identification information indicates data used to mutually identify video data which is processed by an image processing apparatus 100.

First Embodiment

FIG. 1 is a block diagram illustrating the configuration of the image processing apparatus 100 according to a first embodiment. The image processing apparatus 100 includes an upper body feature data storage unit 110 and an upper body detection unit 140. The upper body feature data storage unit 110 stores upper body directional feature data, which indicates the upper body of a person and indicates that the upper body is facing a predetermined direction, for each of a plurality of directions in conjunction with directional data which indicates the direction of the upper body directional feature data. Here, the upper body indicates the part of a human body including, for example, the head and the shoulders. The upper body detection unit 140 extracts upper body image data which indicates the upper body of a person from image data by reading a plurality of upper body directional feature data stored in the upper body feature data storage unit 110 in conjunction with the directional data and by using each of the plurality of upper body directional feature data.

In addition, the image processing apparatus 100 includes a facial feature data storage unit 120, an image data acquisition unit 130, a facial image detection unit 150, and a facial image storage unit 160.

The facial feature data storage unit 120 stores facial directional feature data, which indicates the face of a person and indicates that the face is facing a specific direction, in conjunction with directional data.

The image data acquisition unit 130 obtains the image data, processed by the image processing apparatus 100, in conjunction with image identification information used to discriminate the image data from other image data. The image data may be image data which indicates still images or may be a plurality of image data which indicate each frame of a video.

The facial image detection unit 150 obtains the upper body image data in conjunction with the directional data which corresponds to the upper body directional feature data used when the upper body image data is extracted, and reads facial feature data which corresponds to the obtained directional data from the facial feature data storage unit 120. Thereafter, the facial image detection unit 150 extracts facial image data, which indicates the face of a person, from the upper body image data using the read facial feature data. However, the facial image detection unit 150 may extract the facial image data using facial feature data which does not correspond to the obtained directional data.

The facial image storage unit 160 stores the facial image data detected by the facial image detection unit 150. The facial image storage unit 160 may store the facial image data in conjunction with the directional data which corresponds to facial directional feature data used when the facial image data is extracted.

Meanwhile, each of the components of the image processing apparatus 100 shown in FIG. 1 does not indicate a configuration in hardware units but indicates a block in functional units. Each of the components of the image processing apparatus 100 is implemented using the random combination of hardware and software based on a random computer Central Processing Unit (CPU), a memory, a program which implements the components shown in FIG. 1 and loaded into the memory, a storage unit such as a hard disk which stores the program, and an interface which is used to connect to a network.

FIG. 2 is a view illustrating the configuration of the data stored in the upper body feature data storage unit 110 in table form. The upper body feature data storage unit 110 stores the upper body image feature data (upper body directional feature data) of a person who is facing a relevant direction for each of a plurality of directions (angles). The data configuration of the upper body directional feature data may differ depending on the direction which corresponds to the upper body directional feature data. For example, the upper body directional feature data is determined based on the way in which both hands are imaged, the shape of the body, the shape of the face, the number of eyes, and the like.

FIG. 3 is a view illustrating the configuration of the data stored in the facial feature data storage unit 120 in table form. The facial feature data storage unit 120 stores the feature data (facial feature data), which is used when the facial image of a person who is facing a relevant direction is extracted, for each of a plurality of directions (angles). The facial feature data is determined based on, for example, the shape of the face, the number of eyes, and the like.

FIG. 4 is a view illustrating the configuration of data stored in the facial image storage unit 160 in table form. For each piece of image identification information, the facial image storage unit 160 stores the facial image data which is extracted from image data corresponding to the relevant image identification information. In an example shown in FIG. 4, the image data corresponds to each frame included in video data. Therefore, the image identification information includes video identification information used to identify video data, and information used to specify a frame (for example, time information). In addition, the facial image storage unit 160 stores the facial image data in conjunction with the directional data which corresponds to the facial image data. For example, the facial image storage unit 160 includes a table shown in FIG. 4 for each piece of image identification information and each directional data.

Figure 5:
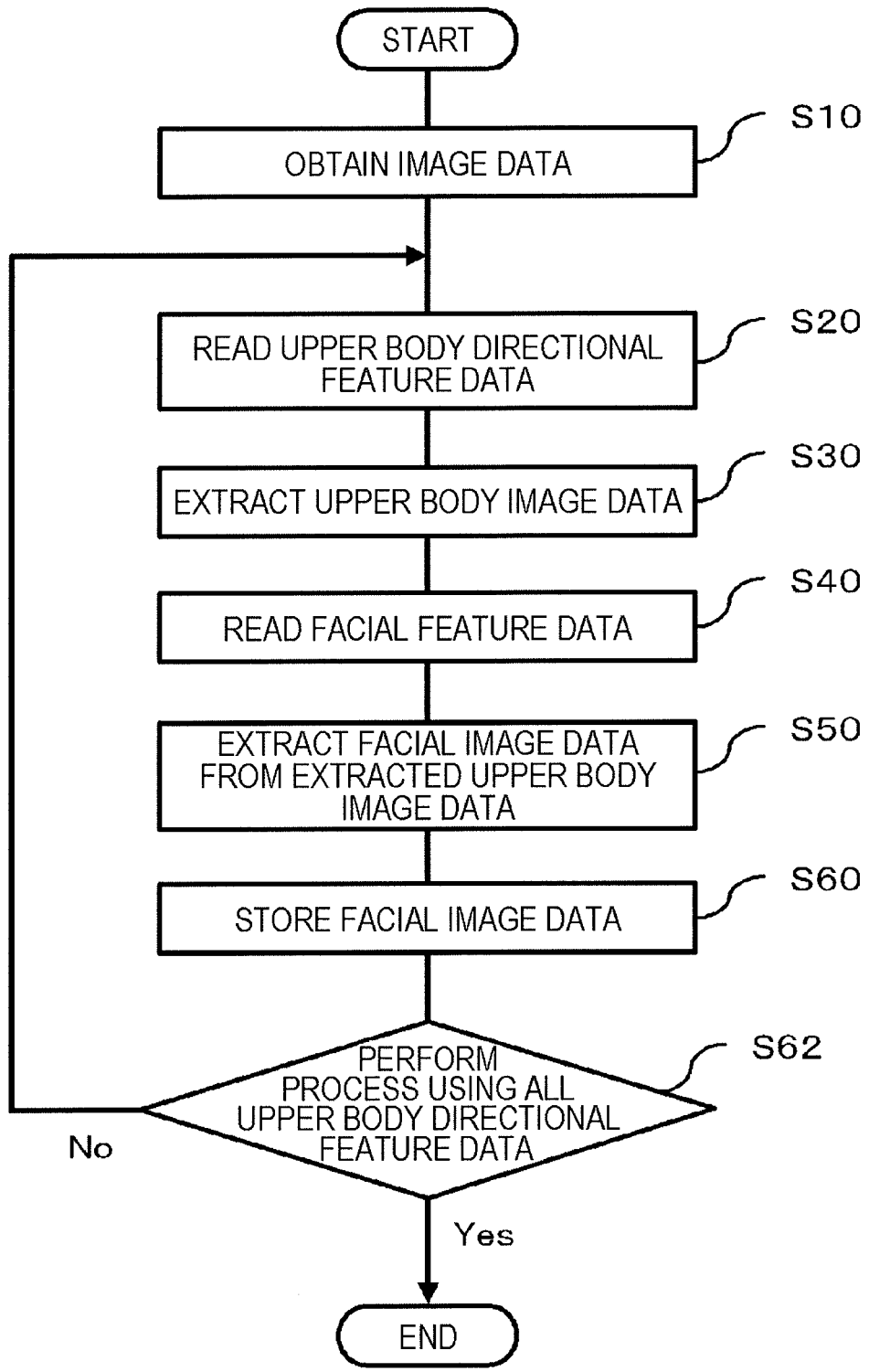
FIG. 5 is a flowchart illustrating the operation of the image processing apparatus shown in FIG. 1.

FIG. 5 is a flowchart illustrating the operation of the image processing apparatus 100 shown in FIG. 1. Each of the processes, including the processes in FIG. 5, which will be described below may be performed immediately or may be performed at appropriate timing based on a batch process.

First, the image data acquisition unit 130 of the image processing apparatus 100 obtains image data in conjunction with image identification information in step S10. The upper body detection unit 140 obtains the image data and the image identification information obtained by the image data acquisition unit 130. Subsequently, the upper body detection unit 140 reads any of the upper body directional feature data from the upper body feature data storage unit 110 in conjunction with the directional data in step S20. Thereafter, the upper body detection unit 140 extracts upper body image data by processing the image data using the read upper body directional feature data in step S30. Thereafter, the upper body detection unit 140 outputs the extracted upper body image data to the facial image detection unit 150. At this time, the upper body detection unit 140 outputs the image identification information and directional data, which corresponds to the upper body directional feature data read in step S20, to the facial image detection unit 150 in conjunction with the upper body image data.

Subsequently, the facial image detection unit 150 reads the facial directional feature data, which corresponds to the directional data obtained from the upper body detection unit 140, from the facial feature data storage unit 120 in step S40. Subsequently, the facial image detection unit 150 extracts facial image data from the upper body image data, obtained from the upper body detection unit 140, using the read facial directional feature data in step S50. Thereafter, the facial image detection unit 150 stores the extracted facial image data in the facial image storage unit 160 in conjunction with the image identification information and directional data which were obtained from the upper body detection unit 140 in step S60. However, as described above, the facial image detection unit 150 may extract the facial image data using facial feature data which does not correspond to the obtained directional data.

The image processing apparatus 100 performs the processes shown in steps S20 to S60 on all upper body directional feature data in step S62.

Subsequently, the operation and effect of the present embodiment will be described. In the present embodiment, the upper body feature data storage unit 110 of the processing apparatus 100 stores upper body directional feature data which corresponds to the direction of each directional data. In addition, the upper body detection unit 140 extracts the upper body image data from the image data using the upper body directional feature data stored in the upper body feature data storage unit 110. Therefore, regardless of the direction of a person, it is possible to accurately detect the figure of a person and detect the direction of the body of the person.

In addition, the facial image detection unit 150 detects the facial image data from the upper body image data which is detected by the upper body detection unit 140. Therefore, compared with the case where a facial image is directly detected from image data, it is possible to accurately detect facial image data.

Meanwhile, as shown in FIG. 6, the facial image storage unit 160 may store the facial image data in conjunction with directional data (upper body direction), which corresponds to the upper body image data from which the facial image data is extracted, in addition to the directional data (direction of the face) which corresponds to the facial feature data used when the facial image data is extracted.

Second Embodiment

Figure 7:
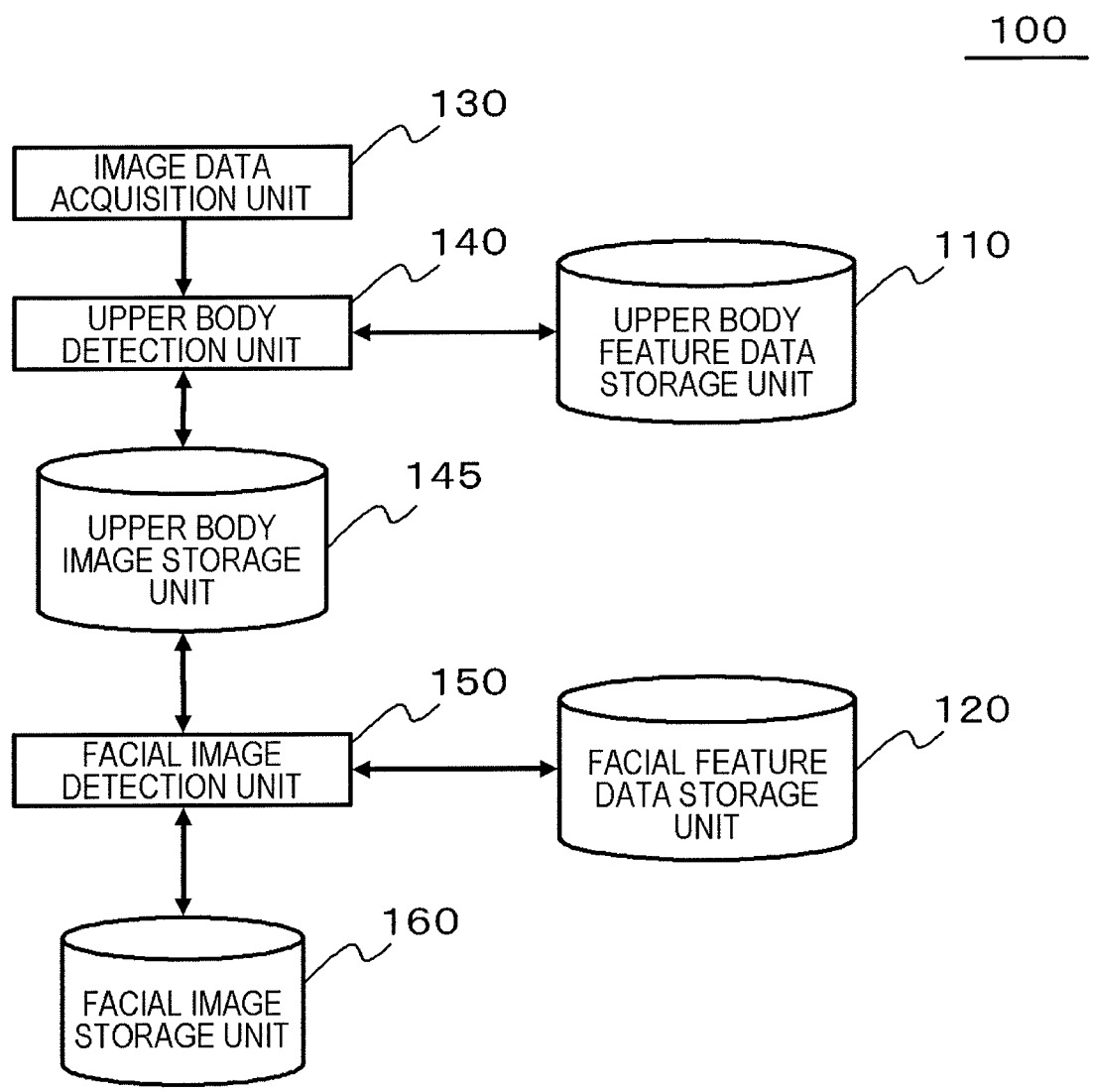
FIG. 7 is a block diagram illustrating the functional configuration of an image processing apparatus according to a second embodiment.

FIG. 7 is a block diagram illustrating the functional configuration of an image processing apparatus 100 according to a second embodiment. The functional configuration of the image processing apparatus 100 according to the second embodiment is the same as that of the image processing apparatus 100 according to the first embodiment except that an upper body image storage unit 145 is included. The upper body image storage unit 145 stores the upper body image data detected by the upper body detection unit 140 in conjunction with the directional data corresponding to the upper body directional feature data used when the upper body image data is extracted.

FIG. 8 is a view illustrating the configuration of data stored in the upper body image storage unit 145 in table form. The upper body image storage unit 145 stores the upper body image data, extracted from the image data corresponding to the image identification information, for each piece of image identification information. The configuration of the image identification information is the same as the configuration according to the first embodiment described with reference to FIG. 4. In addition, the upper body image storage unit 145 stores the upper body image data in conjunction with the directional data corresponding to the upper body image data. For example, the upper body image storage unit 145 includes the table shown in FIG. 8 for each piece of image identification information and for each directional data.

Figure 9:
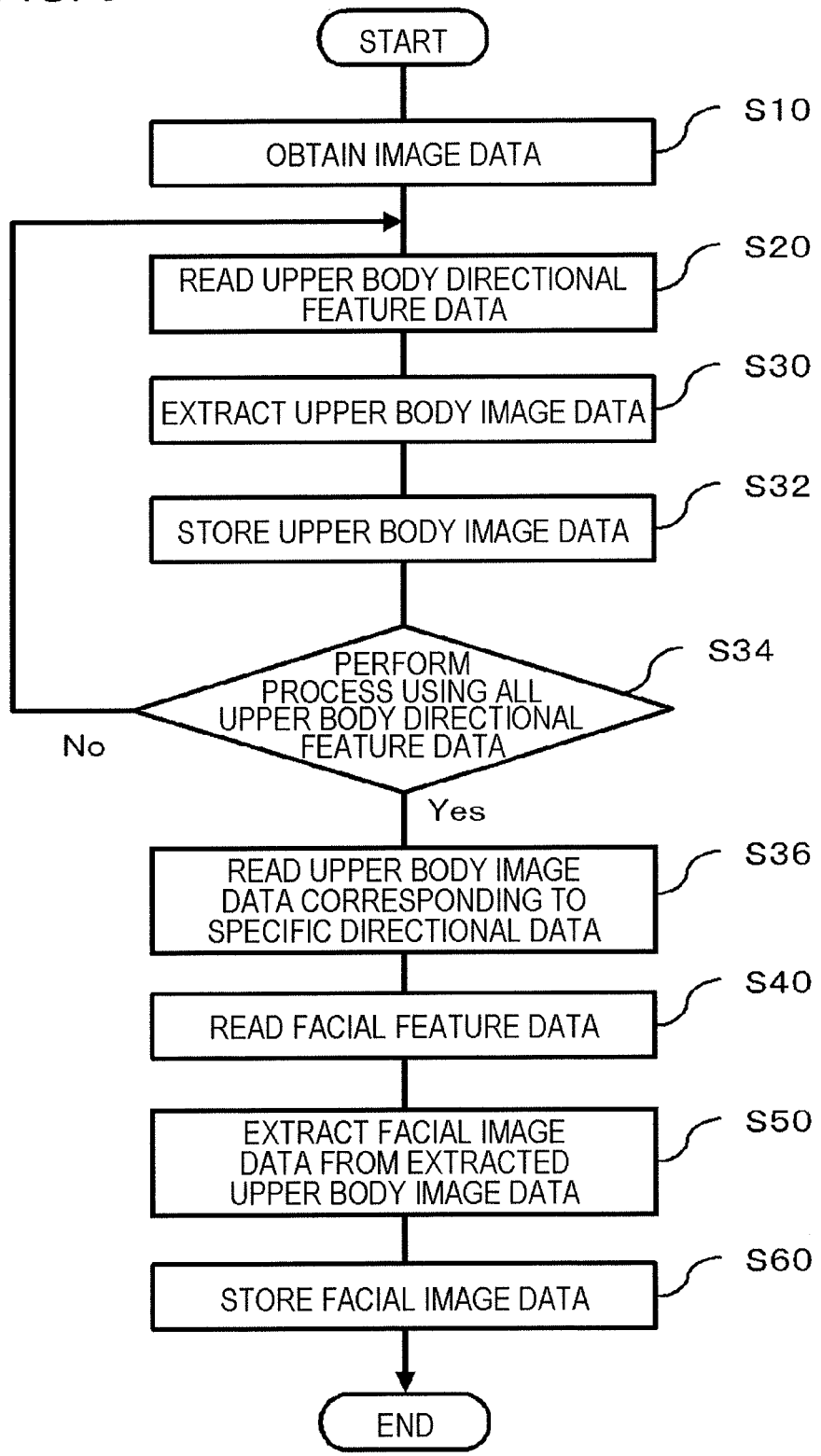
FIG. 9 is a flowchart illustrating the operation of the image processing apparatus shown in FIG. 7.

FIG. 9 is a flowchart illustrating the operation of the image processing apparatus 100 shown in FIG. 7. Since a process of extracting the upper body image data in steps S10 to S30 in the second embodiment is the same as the process described with reference to FIG. 5 in the first embodiment, the description thereof will not be repeated.

When the upper body image data is extracted, the upper body detection unit 140 stores the extracted upper body image data in the upper body image storage unit 145 in conjunction with the image identification information and the directional data in step S32. Thereafter, the upper body detection unit 140 performs the processes shown in steps S20 to S32 on all upper body directional feature data in step S34.

Thereafter, the facial image detection unit 150 only reads the upper body image data corresponding to specific directional data. That is, the facial image detection unit 150 does not read the upper body image data in conjunction with at least one predetermined directional data, for example, facing backward (180°) or facing sideways (90° and 270°), but reads the upper body image data in conjunction with remaining directional data, for example, facing forward (0°), in step S36.

Since subsequent processes in steps S40 to S60 are the same as in the first embodiment, the description thereof will not be repeated.

According to the second embodiment, it is possible to obtain the same effect according to the first embodiment. In addition, since the upper body image storage unit 145 is included, it is possible to process the upper body image data using the extracted upper body image data and the directional data which indicates the direction of the upper body image data. For example, in the example shown in FIG. 9, the facial image detection unit 150 does not perform the facial image extraction process on all upper body image data but performs the facial image extraction process on only the upper body image data which indicates that the upper body is facing a specific direction, for example, forwards. Therefore, it is possible to reduce the load of the image processing apparatus 100.

Third Embodiment

Figure 10:
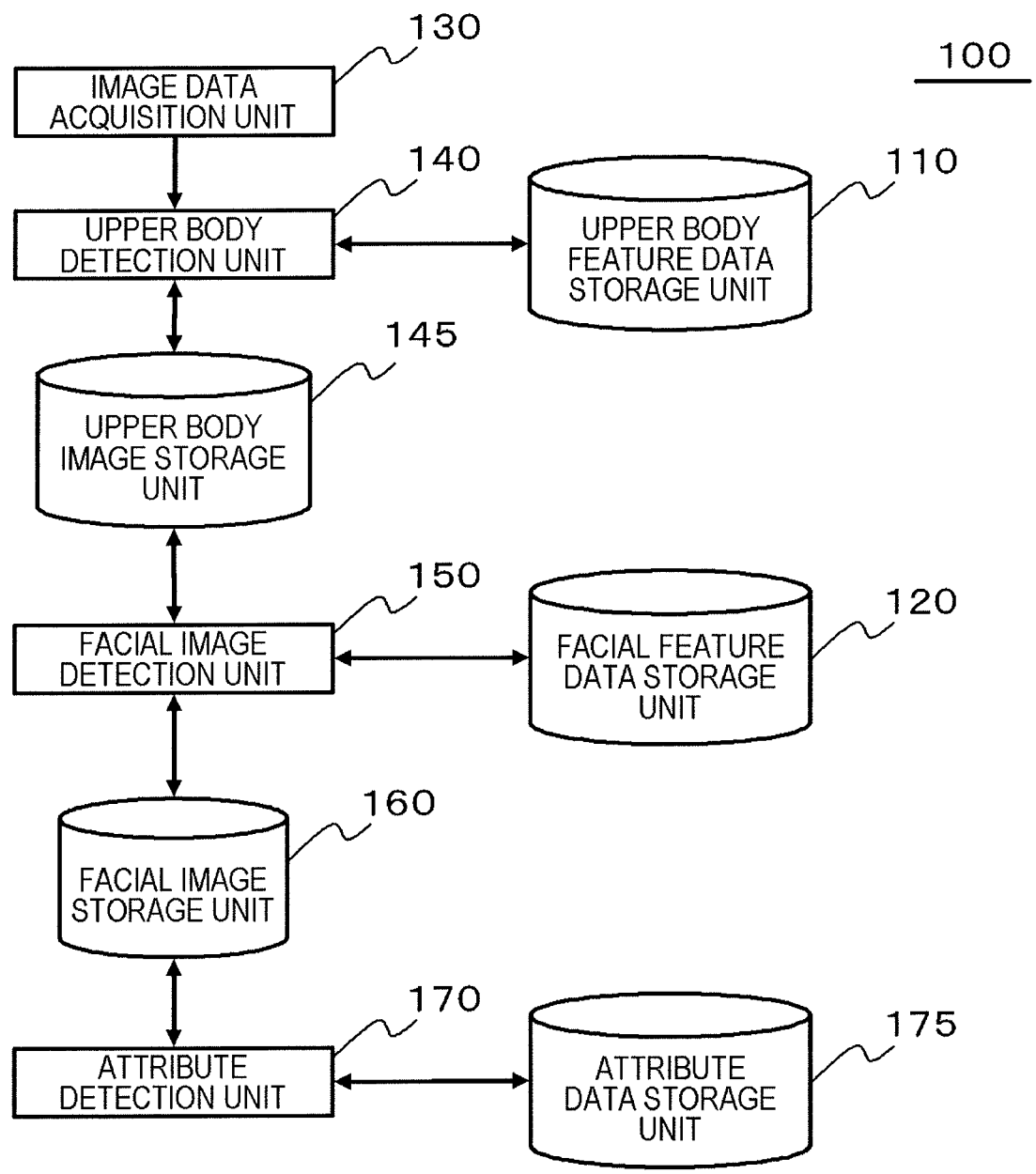
FIG. 10 is a block diagram illustrating the functional configuration of an image processing apparatus according to a third embodiment.

FIG. 10 is a block diagram illustrating the functional configuration of the image processing apparatus 100 according to a third embodiment. The image processing apparatus 100 according to the third embodiment has the same configuration as those of the image processing apparatuses 100 according to the first and second embodiments except that an attribute detection unit 170 and an attribute data storage unit 175 are included. Meanwhile, FIG. 10 shows the same case as the second embodiment.

The attribute data storage unit 175 stores attribute feature data which indicates the features of a face for each attribute, for example, for each age and sex based on, for example, each directional data. The attribute detection unit 170 performs classification on the facial image data stored in the facial image storage unit 160 for each age and sex by reading and using the attribute feature data stored in the attribute data storage unit 175.

In detail, the attribute detection unit 170 reads the facial image data from the facial image storage unit 160 in conjunction with the directional data. Thereafter, the attribute detection unit 170 reads the attribute feature data, which corresponds to the directional data read from the facial image storage unit 160, from the attribute data storage unit 175. Thereafter, the attribute detection unit 170 sets data indicative of the attribute of the facial image data read from the facial image storage unit 160 using the feature data read from the attribute data storage unit 175. Thereafter, the attribute detection unit 170 stores the data indicative of the attribute in the facial image storage unit 160 in conjunction with the facial image data.

Meanwhile, the process performed by the attribute detection unit 170 may be performed on only the facial image data corresponding to predetermined directional data, for example, the directional data which indicates that a person is facing forwards.

FIG. 11 is a view illustrating data stored in the attribute data storage unit 175 in table form. As shown in FIG. 11, the attribute data storage unit 175 stores the attribute feature data indicative of the features of a face for each age and sex in conjunction with the directional data. Meanwhile, although the age group is discriminated in 10-year units in an example shown in FIG. 11, a unit used to define age is not limited thereto. In addition, in the example shown in FIG. 11, the attribute data storage unit 175 stores the feature data which is used when the directional data is 0°, that is, when a person is facing forwards, the attribute data storage unit 175 may further store the feature data which is used when a person is facing the other directions.

FIG. 12 is a view illustrating data stored in the facial image storage unit 160 according to the third embodiment in table form. The facial image storage unit 160 according to the third embodiment stores data indicative of an attribute in addition to the data shown in FIG. 4 in conjunction with the facial image data.

According to the third embodiment, it is possible to obtain the same effect according to the first and second embodiments. In addition, since the facial image data is in conjunction with the data indicative of an attribute, it is possible to analyze a direction which a person corresponding to a specific attribute is facing. In addition, since the attribute data storage unit 175 stores the attribute data for each directional data, the attribute detection unit 170 can set an attribute for each facial image data with high accuracy.

Fourth Embodiment

Figure 13:
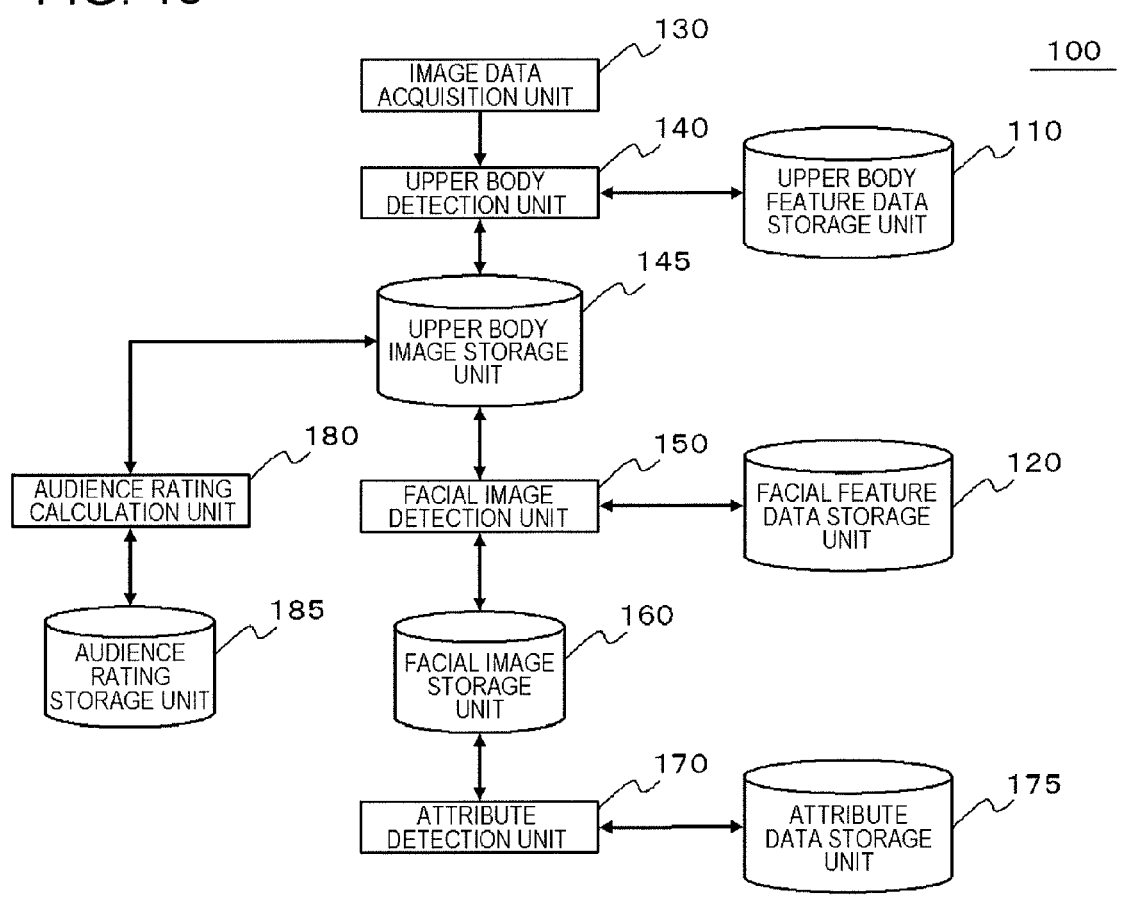
FIG. 13 is a block diagram illustrating the functional configuration of an image processing apparatus according to a fourth embodiment.

FIG. 13 is a block diagram illustrating the functional configuration of an image processing apparatus 100 according to a fourth embodiment. The configuration of the image processing apparatus 100 according to the fourth embodiment is the same as that of the second or third embodiment except for the following points. Meanwhile, FIG. 13 illustrates the same case as in the third embodiment.

In the fourth embodiment, image data is generated by imaging the area in front of an image display apparatus. Further, a plurality of directional data is classified into visual directional data and non-visual directional data. The visual directional data indicates that an upper body, indicated by the upper body image data, is facing the image display apparatus, and non-visual directional data indicates that the upper body, indicated by the upper body image data, is not facing the image display apparatus.

Further, the image processing apparatus 100 includes an audience rating calculation unit 180 and an audience rating storage unit 185. The audience rating calculation unit 180 calculates the audience rating of the image display apparatus using the upper body image data stored in the upper body image storage unit 145. The audience rating is calculated as, for example, a ratio of the number of upper body image data corresponding to the visual directional data to the total number of upper body image data. When there is a plurality of image processing apparatuses 100, the audience rating storage unit 185 calculates audience ratings for the respective pieces of identification information of the image processing apparatuses 100. The audience rating storage unit 185 stores the audience ratings calculated by the audience rating calculation unit 180 in conjunction with information indicative of date and time.

FIG. 14 is a view illustrating data stored in the audience rating storage unit 185 in table form. The audience rating storage unit 185 stores an audience rating for each date and each time slot. When there is a plurality of image processing apparatuses 100, the audience rating storage unit 185 may store the audience rating of each piece of identification information of the image processing apparatus 100 for each date and each time slot. However, the audience rating unit is not limited thereto and overall audience rating may be stored instead of for each piece of identification information of the image processing apparatus 100.

Figure 15:
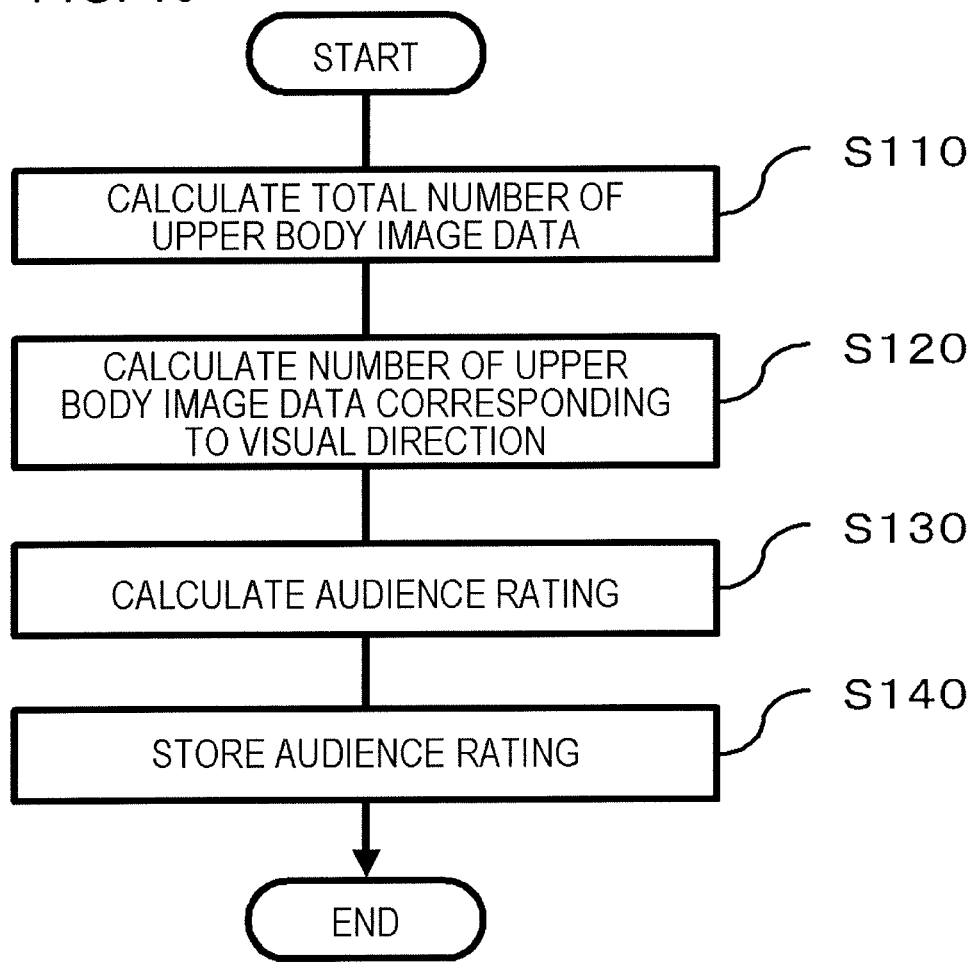
FIG. 15 is a flowchart illustrating the operation of an audience rating calculation unit.

FIG. 15 is a flowchart illustrating the operation of the audience rating calculation unit 180. The audience rating calculation unit 180 performs the processes shown in FIG. 15 at a predetermined timing.

First, the audience rating calculation unit 180 totals the number of upper body image data stored in the upper body image storage unit 145 for each predetermined time slot. Therefore, the total number of upper body image data, that is, the total number of people who pass in front of the image processing apparatus during that time slot is calculated in step S110.

Subsequently, the audience rating calculation unit 180 totals the number of upper body image data corresponding to the visual directional data of the upper body image data stored in the upper body image storage unit 145 for each predetermined time slot. Therefore, the number of people estimated to have viewed the image processing apparatus during that time slot is calculated in step S120.

Subsequently, the audience rating calculation unit 180 calculates the audience rating for each predetermined time slot by dividing the number, calculated in step S120, by the number, calculated in step S110, in step S130. Thereafter, the audience rating calculation unit 180 stores the audience rating for each time slot in the audience rating storage unit 185 in step S140.

In the fourth embodiment, it is possible to perform the same process and obtain the same effect according to the second or third embodiments. In addition, although the audience rating calculation unit 180 calculates the audience rating, the audience rating is calculated based on the number of upper body image data. That is, data which is the population parameter of the audience rating in the fourth embodiment includes people who are difficult to detect, for example, people who are facing sideways or backward, using only face detection. Therefore, it is possible to calculate the audience rating with high accuracy.

In addition, there is a case where it is possible to estimate the reason why a person who passes the area in front of the image processing apparatus do not view the image processing apparatus by analyzing the number of upper body image data corresponding to the non-visual directional data.

Meanwhile, in the fourth embodiment, the image data processed by the image processing apparatus 100 may be generated by imaging an exhibition space. In this case, by using the image processing apparatus 100, it is possible to calculate the audience rating of the exhibition space, that is, a ratio of the number of people who viewed the exhibition space to the total number of people who passed the area in front of the exhibition space.

In addition, when the facial image storage unit 160 has the data configuration shown in FIG. 6, the audience rating calculation unit 180 may calculate the audience rating using the data stored in the facial image storage unit 160. In this case, the audience rating calculation unit 180 can individually calculate the audience rating based on a combination of the direction of an upper body and the direction of a face. In this case, the facial feature data storage unit 120 stores the facial feature data for each direction of a face regardless of the direction of the upper body indicated by the upper body image data. In addition, the facial image data detection unit 150 stores the direction of a face, which corresponds to the facial feature data used when the facial image data is detected, in the facial image storage unit 160.

For example, the audience rating calculation unit 180 may calculate the number of the facial image data which indicates that both the upper body and the face are facing forwards of the image display apparatus for each predetermined time slot, and may use the calculated number as the numerator used when a first audience rating is calculated. In addition, the audience rating calculation unit 180 may calculate the number of facial image data which indicates that only the face is facing forwards of the image display apparatus for each predetermined time slot, and may use the calculated number as the numerator used when a second audience rating is calculated. Meanwhile, when any of the first and second audience ratings is calculated, the denominator of the audience rating is determined by calculating the total number of facial image data stored in the facial image storage unit 160 for each predetermined time slot. In this case, for example, the configuration of the image processing apparatus 100 can be the same as in the first embodiment.

Fifth Embodiment

Figure 16:
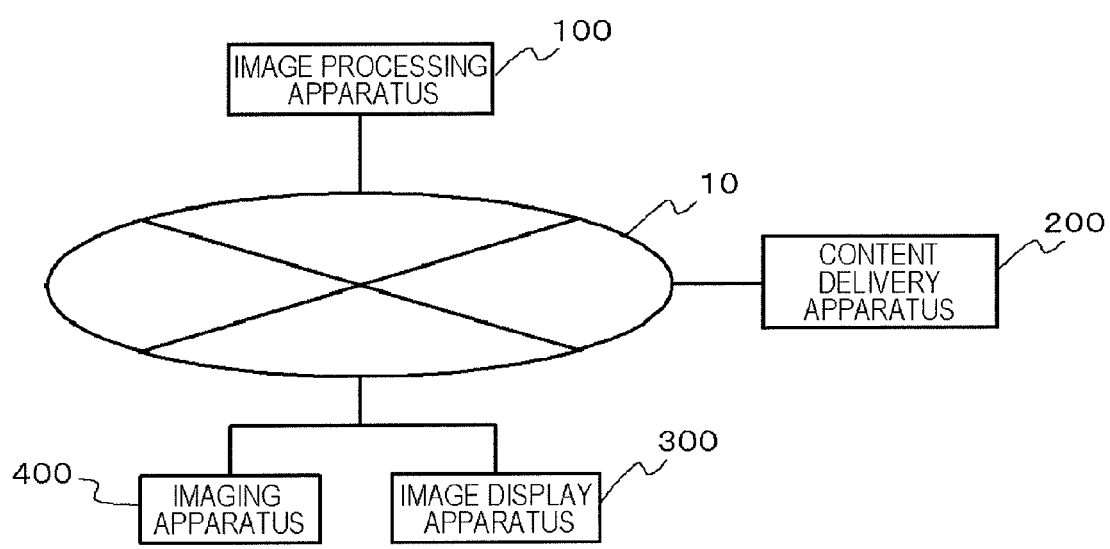
FIG. 16 is a view illustrating the configuration of a content delivery system according to a fifth embodiment.

FIG. 16 is a view illustrating the configuration of a content delivery system according to a fifth embodiment. The content delivery system includes an image processing apparatus 100, a content delivery apparatus 200, an image display apparatus 300, and an imaging apparatus 400.

The content delivery apparatus 200 stores image content and transmits the image content to the image display apparatus 300 over a communication network 10 such as an Internet network. The image display apparatus 300 displays the image content received from the content delivery apparatus 200. The imaging apparatus 400 generates image data, for example, video data obtained by imaging the area in front of the image display apparatus 300, and immediately transmits the image data to the image processing apparatus 100 over the communication network 10. The image processing apparatus 100 performs the process described in the fourth embodiment on the image data received from the imaging apparatus 400.

Figure 17:
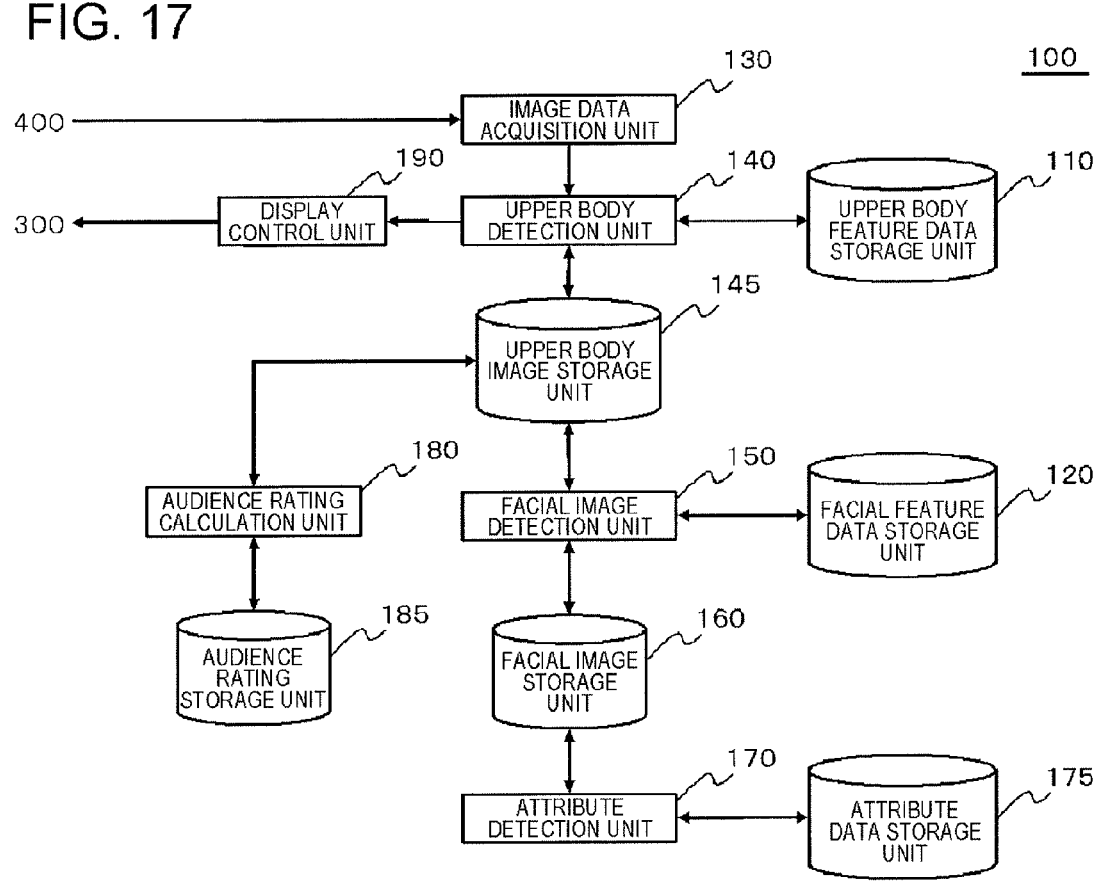
FIG. 17 is a block diagram illustrating the functional configuration of an image processing apparatus.

FIG. 17 is a block diagram illustrating the functional configuration of the image processing apparatus 100 according to the fifth embodiment. The image processing apparatus 100 according to the fifth embodiment is the same as the image processing apparatus 100 according to the fourth embodiment except for the following points.

First, the image data acquisition unit 130 receives image data from the imaging apparatus 400. Thereafter, the upper body detection unit 140 immediately processes the received image data and extracts upper body image data.

In addition, the image processing apparatus 100 includes a display control unit 190. The display control unit 190 controls the image display apparatus 300 based on the number of upper body image data corresponding to visual directional data and directional data corresponding to the extracted upper body image data from among the upper body image data detected by the upper body detection unit 140.

Figure 18:
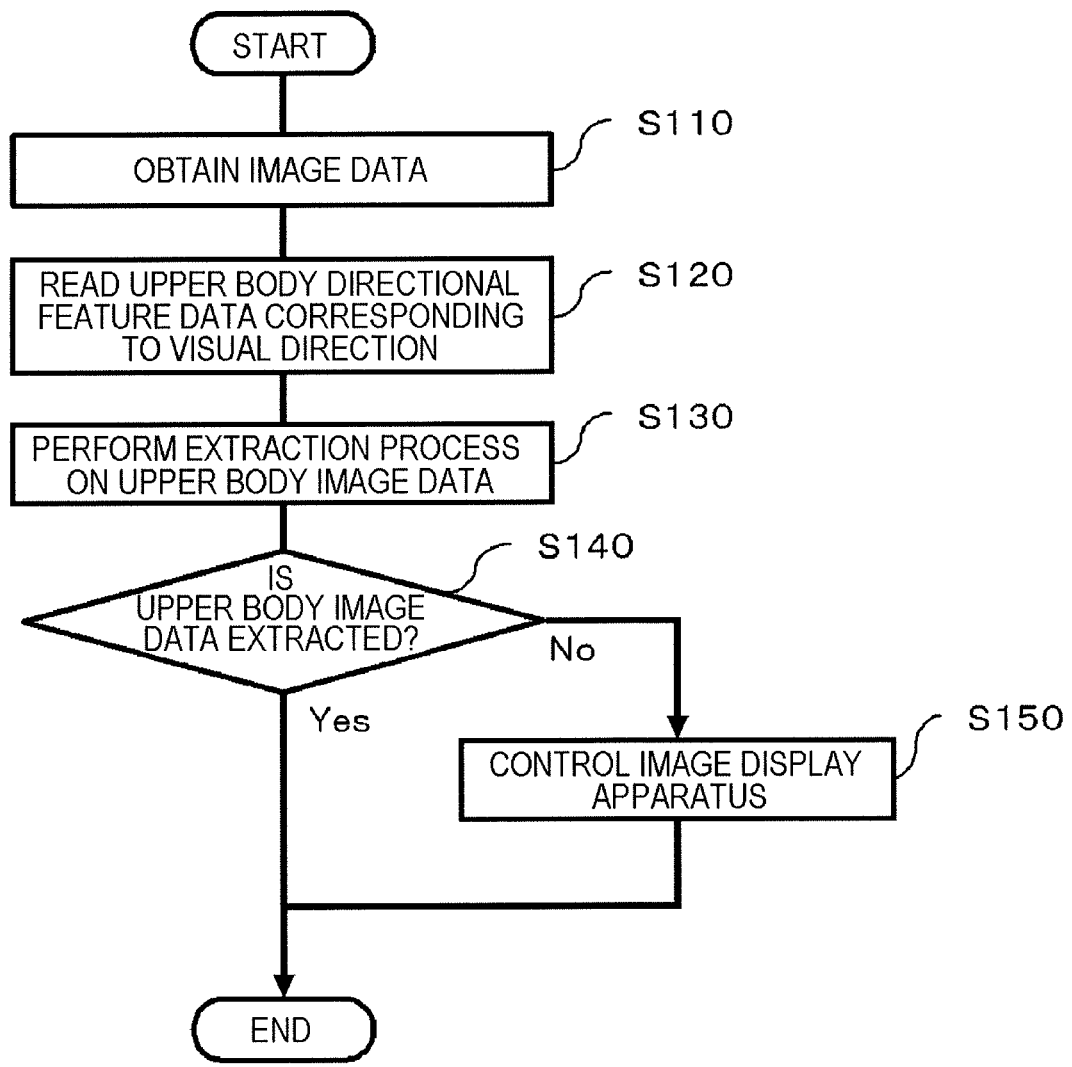
FIG. 18 is a flowchart illustrating an example of processes performed by a display control unit.

FIG. 18 is a flowchart illustrating an example of a process performed by the display control unit 190. If the image data acquisition unit 130 of the image processing apparatus 100 obtains image data in step S110, the upper body detection unit 140 immediately reads upper body directional feature data corresponding to visual directional data in step S120. Subsequently, the upper body detection unit 140 performs a process of extracting upper body image data from the image data, obtained in step S110, using the upper body directional feature data, read in step S120, in step S130. When the upper body image data is extracted in step S140 (Yes), the display control unit 190 does not perform a process. When the upper body image data is not extracted in step S140 (No), the display control unit 190 controls the image display apparatus 300 in step S150. The control performed here includes, for example, a process of increasing the sound of the image display apparatus 300 or a process of stopping the display of the image display apparatus 300.

In addition, when the display control unit 190 controls the image display apparatus 300 based on the directional data corresponding to the extracted upper body image data, the upper body detection unit 140 immediately performs the process of extracting the upper body image data from the image data, obtained in step S110, using all the upper body directional feature data. Thereafter, the image display apparatus 300 is controlled based on the results of totaling of the directional data corresponding to the extracted upper body image data. The details of the control includes, for example, a process of increasing the sound of the image display apparatus 300 and a process of stopping the display of the image display apparatus 300.

According to the fifth embodiment, it is possible to obtain the same effect according to the fourth embodiment. In addition, the display control unit 190 controls the image display apparatus 300 based on the number of upper body image data corresponding to the visual directional data. Therefore, it is possible to control the image display apparatus 300 based on the number of people who viewed the image display apparatus 300.

Meanwhile, when the image content is in conjunction with data indicative of attributes (sex and age), the image processing apparatus 100 may control the content delivery apparatus 200. For example, the image processing apparatus 100 extracts the facial image data from the upper body image data extracted in step S130, and recognizes data indicative of attributes corresponding to the facial image data. Thereafter, the image processing apparatus 100 causes the content delivery apparatus 200 to deliver image content corresponding to the recognized attributes to the image display apparatus 300. Therefore, it is possible to display the image content on the image display apparatus 300 together with the attributes of a person who is watching the image display apparatus 300.

Hereinbefore, although the embodiments of the present invention have been described with reference to the drawings, the embodiments correspond to the examples of the present invention and other various types of configurations can be used in addition thereto.

The present application made a declaration of priority under Japanese Patent Application No. 2010-045744 filed on Mar. 2, 2010, and the disclosure thereof is disclosed herein.

The invention claimed is:

1. An image processing apparatus, comprising:
    an upper body feature data storage device configured to store upper body directional feature data, which indicates an upper body including a head and shoulders of a person and indicates that the upper body is facing a specific direction, for each of a plurality of directions in conjunction with directional data indicative of a direction of the upper body directional feature data; and
    an upper body detection device configured to extract upper body image data indicative of the upper body of the person from image data by reading the plurality of upper body directional feature data stored in the upper body feature data storage device in conjunction with the directional data and using each of the plurality of upper body directional feature data;
    a facial feature data storage device configured to store facial directional feature data indicative of a face of the person in conjunction with the directional data;
    a facial image detection device configured to obtain the upper body image data in conjunction with the directional data corresponding to the upper body directional feature data used when the upper body image data is extracted, which reads the facial directional feature data corresponding to the obtained directional data from the facial feature data storage device, and configured to extract facial image data indicative of the face of the person from the upper body image data using the read facial directional feature data; and
    a facial image storage device configured to store the facial image data detected by the facial image detection device.

2. The image processing apparatus according to claim 1, further comprising:
    an upper body image storage device configured to store the upper body image data, detected by the upper body detection device, in conjunction with the directional data corresponding to the upper body directional feature data used when the upper body image data is extracted.

3. The image processing apparatus according to claim 1, wherein the facial image detection device does not read the upper body image data which is in conjunction with at least one predetermined directional data but reads the upper body image data which is in conjunction with a remaining directional data.

4. The image processing apparatus according to claim 1, further comprising:
    an attribute data storage device configured to store attribute feature data indicative of features of a face for each attribute; and
    an attribute detection device configured to perform classification on the facial image data for each age and sex by reading and using the attribute feature data stored in the attribute data storage device.

5. The image processing apparatus according to claim 4, wherein the attribute detection device is configured to perform classification on only the facial image data corresponding to the predetermined directional data for each age and sex.

6. The image processing apparatus according to claim 1, wherein the image data is generated by imaging a front of an image display apparatus.

7. The image processing apparatus according to claim 6, wherein the directional data is classified into visual directional data which indicates that an upper body indicated by the upper body image data is facing the image display apparatus and non-visual directional data which indicates that the upper body is not facing the image display apparatus, and
    wherein the image processing apparatus further comprises:
    an upper body image storage device configured to store the upper body image data, detected by the upper body detection device, in conjunction with the directional data corresponding to the upper body directional feature data used when the upper body image data is extracted; and
    an audience rating calculation device configured to calculate a ratio of a number of the upper body image data corresponding to the visual directional data to a total number of the upper body image data as an audience rating using the upper body image data stored in the upper body image storage device.

8. The image processing apparatus according to claim 1, wherein the image data is generated by imaging a front of an image display apparatus,
wherein the facial feature data storage device configured to store the facial feature data for each direction of the face,
wherein the facial image storage device is configured to store the facial image data in conjunction with a direction corresponding to the facial feature data used when the facial image data is extracted and in conjunction with the directional data corresponding to the upper body directional feature data used when the upper body image data, from which the facial image data is extracted, is extracted, and
wherein the image processing apparatus further comprises an audience rating calculation device configured to calculate a number of the facial image data, estimated that the image display apparatus is viewed, using a combination of the direction of the face stored in the facial image storage device and the directional data, and configured to calculate a ratio of the calculated number to a total number of the facial image data as an audience rating.

9. The image processing apparatus according to claim 6, wherein the directional data is classified into visual directional data which indicates that the upper body indicated by the upper body image data is facing the image display apparatus and non-visual directional data which indicates that the upper body is not facing the image display apparatus,
wherein the upper body detection device is configured to immediately obtain the image data from an imaging apparatus configured to generate the image data, and is configured to extract the upper body image data from the immediately obtained image data, and
wherein the image processing apparatus further comprises a display control device configured to control the image display apparatus based on a number of the upper body image data which is extracted from the immediately obtained image data and corresponds to the visual directional data.

10. The image processing apparatus according to claim 6, wherein the upper body detection device is configured to immediately obtain the image data from the imaging apparatus configured to generate the image data, and is configured to extract the upper body image data from the immediately obtained image data, and
wherein the image display apparatus is controlled based on the directional data corresponding to the upper body image data extracted from the immediately obtained image data.

11. An image processing apparatus, comprising:
an image acquisition device configured to obtain image data; and
a first image processing device configured to extract upper body image data indicative of an upper body including a head and shoulders of a person from the image data obtained from the image acquisition device, and configured to specify a direction of a body indicated by the upper body image data; and
a second image processing device configured to read a facial directional feature data indicative of a face of the person from a facial feature data storage device configured to store facial directional feature data in conjunction with a direction of a body using the specified direction by the first image processing device, and configured to extract facial image data indicative of the face of the person from the upper body image data extracted by the first image process device using the read facial directional feature data.

12. A content delivery apparatus, comprising:
a content storage device configured to store image content;
an image display apparatus configured to receive the image content stored in the content storage device over a communication network, and configured to display the received image content;
an imaging apparatus configured to image an area in front of the image display apparatus and configured to generate image data; and
an image processing apparatus configured to receive the image data over the communication network and configured to process the received image data,
wherein the image processing apparatus comprises:
an upper body feature data storage device configured to store upper body directional feature data, which indicates an upper body including a head and shoulders of a person and indicates that the upper body is facing a specific direction, for each of a plurality of directions in conjunction with directional data indicative of a direction of the upper body directional feature data; and
an upper body detection device configured to extract upper body image data indicative of the upper body of the person from image data by reading the plurality of upper body directional feature data stored in the upper body feature data storage device in conjunction with the directional data and using each of the plurality of upper body directional feature data;
a facial feature data storage device configured to store facial directional feature data indicative of a face of the person in conjunction with the directional data;
a facial image detection device configured to obtain the upper body image data in conjunction with the directional data corresponding to the upper body directional feature data used when the upper body image data is extracted, configured to read the facial directional feature data corresponding to the obtained directional data from the facial feature data storage device, and configured to extract facial image data indicative of the face of the person from the upper body image data using the read facial directional feature data; and
a facial image storage device configured to store the facial image data detected by the facial image detection device.

13. An image processing method, comprising:
storing upper body directional feature data, which indicates an upper body including a head and shoulders of a person and indicates that the upper body is facing a specific direction, for each of a plurality of directions in conjunction with directional data indicative of the direction of the upper body directional feature data;
extracting upper body image data indicative of the upper body of the person from image data by using each of the plurality of the upper body directional feature data;
storing facial directional feature data indicative of face of the person in conjunction with the directional data;
obtaining the upper body image data in conjunction with the directional data corresponding to the upper body directional feature data used when the upper body image data is extracted;
reading the facial directional feature data corresponding to the obtained directional data from the facial feature data storage device;

extracting facial image data indicative of the face of the person from the upper body image data using the read facial directional feature data; and storing the facial image data detected by the facial image detection device.

14. A non-transitory computer-readable recording medium for storing a program that makes a computer execute:

storing upper body directional feature data, which indicates an upper body including a head and shoulders of a person and indicates that the upper body is facing a specific direction, for each of a plurality of directions in conjunction with directional data indicative of the direction of the upper body directional feature data;

extracting upper body image data indicative of the upper body of the person from an image data by using each of the plurality of the upper body directional feature data;

storing facial directional feature data indicative of a face of the person in conjunction with the directional data;

obtaining the upper body image data in conjunction with the directional data corresponding to the upper body directional feature data used when the upper body image data is extracted;

reading the facial directional feature data corresponding to the obtained directional data from the facial feature data storage device;

extracting facial image data indicative of the face of the person from the upper body image data using the read facial directional feature data; and storing the facial image data detected by the facial image detection device.

* * * * *